Figure 1:
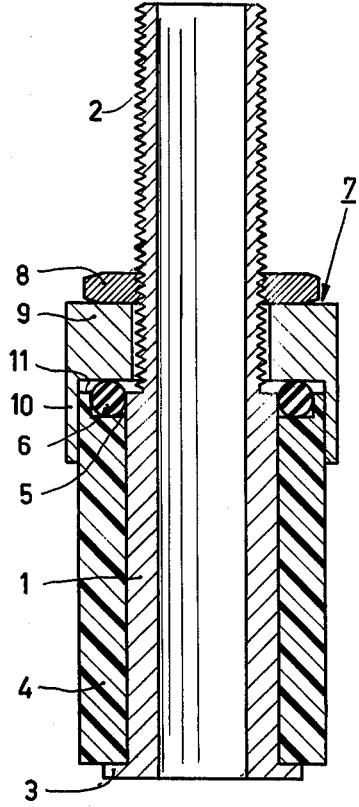

United States Patent [19]

Acda

[11] 4,070,042
[45] Jan. 24, 1978

[54] HIGH-STRENGTH COUPLING OF PLASTIC PIPE TO METAL PIPE

[75] Inventor: Petrus Marinus Acda, Enkhuizen, Netherlands

[73] Assignee: Polva Nederland B.V., Enkhuizen, Netherlands

[21] Appl. No.: 736,175

[22] Filed: Oct. 27, 1976

[30] Foreign Application Priority Data

Oct. 17, 1975 Netherlands .................. 7512189

[51] Int. Cl.$^2$ .................................... F16L 47/02
[52] U.S. Cl. ................... 285/21; 29/526 R; 285/174; 285/348
[58] Field of Search .............. 285/174, DIG. 16, 348, 285/357, 356 (U.S. only), 21; 29/526

[56] References Cited

U.S. PATENT DOCUMENTS

| 609,383 | 8/1898 | Anderson | 285/174 |
|---|---|---|---|
| 2,227,105 | 12/1940 | Pritchard | 285/356 X |
| 2,568,301 | 9/1951 | Pottberg et al. | 285/348 X |
| 2,575,685 | 11/1951 | Shugart et al. | 285/356 X |
| 2,702,201 | 2/1955 | Romanelli et al. | 285/356 X |
| 2,776,151 | 1/1957 | Harkenrider | 285/174 |
| 2,933,428 | 4/1960 | Mueller | 285/DIG. 16 X |
| 3,479,060 | 11/1969 | Westbrook et al. | 285/174 X |
| 3,791,680 | 2/1974 | Cleare | 285/174 |
| 3,921,297 | 11/1975 | Vit | 285/174 X |
| 3,957,293 | 5/1976 | Rodgers | 285/174 |

FOREIGN PATENT DOCUMENTS 2,352,571 10/1974 Germany .......................... 285/174

*Primary Examiner*—Thomas F. Callaghan
*Attorney, Agent, or Firm*—Frank R. Trifari; David R. Treacy

[57] ABSTRACT

A coupling device for coupling plastic pipe to metal pipe. A metal connecting piece has one end arranged for connection to a metal pipe, and a stop at the other end. A plastic coupling member around the connecting piece can be welded to the plastic pipe and has an open inner sealing chamber for a sealing ring. A hold-down member screwed on the connecting piece applies direct axial force onto the ring in the sealing chamber and presses the coupling member against the stop at the same time.

5 Claims, 2 Drawing Figures

HIGH-STRENGTH COUPLING OF PLASTIC PIPE TO METAL PIPE

The invention relates to a high-strength coupling device for coupling a plastic pipe to a metal pipe and in particular to a coupling device comprising a tubular metal connecting piece which is provided along part of its length with an external screw thread, and has one end which can be coupled by welding or screwing to the metal pipe end and another end provided with a stop for a plastic cylindrical coupling member applied around the connecting piece, which coupling member has an internal recess which accommodates a sealing ring and which coupling member can be welded to the plastic pipe end and a hold-down element which has an internal screw thread engaging that of the connecting piece, so that the hold-down element can be moved along the connecting piece.

Such a coupling device is known from German Auslegeschrift No. 2,352,571. The polyethylene coupling member used in the known coupling has the shape of a sleeve which extends on both sides of the stop and whose inner side is provided with an annular ridge having a conical surface which forms a gas-tight seal with a conical surface of the stop. Optionally, the sleeve may be provided with a cylindrical insert which is welded to the inner surface and which also consists of polyethylene.

The gas-tight seal characteristic, as well as the tensile strength of this known device, is mainly based on mating of the above-mentioned conical surfaces. This implies that particular care must be paid to the finish and to the design of the surfaces.

In the known device the conical surface of the coupling member is pushed against that of the stop by displacing a nut along the screw thread of the metal connecting piece. It is a known fact that polyethylene and in general polyolefinic synthetic resin materials can be deformed plastically even at rather low temperatures under the influence of pressure. This means that seals produced in accordance with the known coupling are not fully reliable especially for long periods of time. This is especially true in the event a tensile load is exerted upon the known coupling device so that extra forces are exercised on the mating conical surfaces which determine the tensile strength of the coupling device. Furthermore it should be borne in mind that, in the case of fusing by means of welding-heat is transported between the sleeve and the plastic pipe to be connected to it from the welding area to the adjacent conical surface. This also promotes plastic deformation of the conical surface of the sleeve.

The above-mentioned German Auslegeschrift also discloses that, especially when an insert is used between sleeve and metal connecting piece, the gas-tight properties of the device can be improved by means of two rubber O-rings which engage the outer wall of the metal connecting piece and which are seated in circular grooves in the inner surface of the insert or of the sleeve. It also applies here that heat released during welding may result in deformation of the insert and/or the sleeve so that the sealing action of the O-rings is not sufficiently guaranteed.

The Applicant has now developed a coupling device of the kind mentioned in the preamble which mitigates the above-mentioned objections. The coupling device according to the invention is exceedingly reliable and sure in operation, as regards both the tensile strength and to the gas-tight properties.

More particularly in a coupling device according to the invention the end of the coupling member which faces the hold-down element is provided with a sealing chamber along the inner surface which chamber is open at the end which faces the hold-down element, a direct force being exercised on the sealing ring seated in the sealing chamber when the hold-down element is moved.

The gas-tight seal is exclusively effected by the mating and the direct contact of the hold-down element and the sealing ring. So, in contradistinction to the above-mentioned prior art technique the seal is not coupled or combined with provisions for the tensile strength of the coupling.

In this respect it should be noted that the tensile strength of the coupling device is based on the mating of the coupling member and the stop of the metal connection piece. The degree in which the stop can take up the forces exercised on the coupling member when a tensile load is applied is decisive for the tensile strength of the coupling device. The stop may be constructed in widely different manners and may, for example, consist of one or a plurality of bosses provided on the outer surface of the connecting piece. The stop may also be in the form of, for example, a raised flange with closed surface or may consist of a clamping ring provided around the connecting piece.

Preferably, that part of the stop which supports the coupling element is perpendicular to the axis of the cylindrical coupling member. If so desired the tensile strength can be increased by press-fitting the coupling member to the metal connecting piece which increases the frictional resistance between the coupling member and the connecting piece. For production and/or technical reasons preference is given to a construction in which the coupling member is applied in such a way that it can be moved around the connecting piece.

The hold-down element with which force can be directly exercised on the sealing ring may also be of various constructions. The hold-down element which is provided with an internal screw thread may consist of a locking nut with a pressure plate which is either integrally connected or not integrally connected to it. When the locking nut is moved along the threaded portion of the coupling piece the pressure plate exercises a force on the sealing ring which is consequently pressed against the walls of the sealing chamber and the outer surface of the connecting piece, thereby effecting a gastight seal.

In a preferred embodiment the hold-down element comprises a pressure ring which can at least partly be seated in the sealing chamber. The pressure ring may be in the form of a ridge which is fixed to the pressure plate but preferably is a loose ring which is not secured to the pressure plate. This embodiment achieves the object that when the hold-down element is moved the rotational forces which are then produced do not act on the sealing ring, which might result in distortion of the sealing ring, but they act on the pressure ring which can easily absorb these forces owing to its smooth surface.

In a further advantageous embodiment the hold-down element comprises a pressure plate provided with an outer cylindrical collar the inner surface of which engages the outer surface of the coupling member. The force exercised by the hold-down element on the sealing ring results produces an outwardly directed radial force on the outer wall of the coupling member at the location of the sealing ring. Depending on the mechanical qualities of the plastics material from which the coupling member is produced and of course also on the magnitude of the force, this may cause the outer wall of the coupling member to be deformed. When a hold-down element is used having an outer collar as described above, the deformation of the coupling member is prevented because the wall part under pressure is enclosed by said collar.

As has already been stated in the preamble, the high-strength coupling device is intended for coupling a metal pipe end to a plastic pipe end. Both the metal pipe end and the plastic pipe end may be part of pipe lines through which a liquid or gas is transported. It is also possible that said pipe portions are part of fittings such as, for example, cocks, pumps, tapping tees and sleeves.

The invention also relates to this assembly of plastic pipe ends, high-strength coupling device and metal pipe end.

Furthermore the invention relates to a method of coupling a metal pipe end to a plastic pipe end in a gas-tight manner. In accordance with the invention a cylindrical plastic coupling member, one end of which is provided with a sealing chamber which is applied to the inner wall and which is open towards the end, is applied around a tubular metal connecting piece which is partially provided with an external screw thread and an end of which comprises a stop, in such a way that the end of the coupling member which faces away from the sealing chamber engages the stop; thereafter the coupling member is fused by means of welding to the plastic pipe end, and if so desired the end of the connecting piece which faces away from the stop is also fastened to the metal pipe end by means of welding or screwing; whereafter a sealing ring is applied in the sealing chamber of the coupling element, which ring is securely clamped in the sealing chamber by means of a hold-down element which is slidingly fitted around the connecting piece and which is provided with an internal screw thread which engages that of the connecting piece; and finally the metal pipe end is connected to the end of the connecting piece which faces away from the stop by means of welding or screwing.

In this method it is especially important that clamping the sealing ring takes place after the coupling member and, possibly, also the metal connecting piece is connected to the plastic pipe end and the metal pipe end respectively. This achieves that any evolved heat and consequently possible plastic deformation of the coupling member does not affect the gastight seal which is to be effected thereafter. If the metal connecting piece is coupled by means of screwing to the metal pipe end, or in case of welding the welding area is sufficiently remote from the coupling member so that welding heat does not affect it, coupling of the metal connecting piece to the metal pipe end can also be effected after the sealing ring is clamped in the sealing chamber.

The cylindrical coupling member is connected to the plastic pipe end by means of a welding method which is customary for plastic materials. Examples of such welding methods are "electroweld" and "polyfusion". In the electroweld system the surfaces to be welded are heated by sending an electric current through resistance wires applied in the surfaces. According to the polyfusion system the surfaces to be fused are first heated by means of special heating elements and thereafter brought into contact. Suitable plastic materials used for the coupling member are capable of being welded. Examples of such plastic materials are, for example, polyolefins, such as polyethylene and polypropylene.

Figure 2:
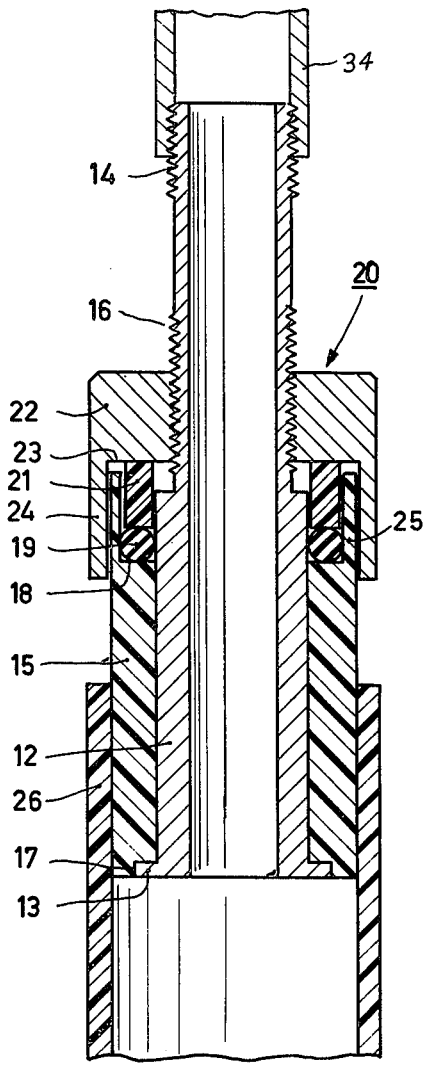

The invention will be further explained with reference to the accompanying drawing in which:

FIG. 1 shows a cross-sectional view of a coupling device according to the invention and FIG. 2 shows a cross-sectional view of a preferred embodiment of the coupling device Reference 1 in FIG. 1 indicates a metal connecting piece one end of which is provided with an external screw thread 2 and the other end with a stop 3. The stop is in the form of a collar which is perpendicular to the axis of the connecting piece 1. A cylindrical coupling member 4, which is made of polyethylene is slidingly fitted round connecting piece 1. One end of the coupling member engages stop flange 3 and the other end has a sealing chamber 5 formed as an annular recess in the inner surface. The sealing chamber 5 accommodates a rubber sealing ring 6 which is pressed gas-tight against the side walls of the sealing chamber and the outer surface of the connecting piece 1 by means of a hold-down element 7 which can be moved along the connecting element 1. The hold-down element 7 consists of a locking nut 8 and a pressure plate 9. The latter exercises a force on the sealing ring 6 by rotation of nut 8 around connecting piece 1 which effects a gas-tight seal between coupling member 4 and connecting piece 1. The pressure plate 9 is provided with an outer cylindrical collar 10 the inner surface of which engages the outer wall of the coupling member over of the sealing chamber 5. A plastic pipe end (not shown in FIG. 1) can be fused in a customary manner to the outer surface of coupling member 4. The end of connecting element 1 which faces away from the stop 3 can also be connected in a customary manner to a metal pipe end by means of screwing or welding. It should be noted that in the embodiment of the coupling according to FIG. 1 the sealing ring extends to beyond the open end 11 of the sealing chamber so that an adequate sealing deformation of sealing ring 6 can be realized by pressure plate 9. Furthermore locking nut 8 is not integrally connected to pressure plate 9 so that, when the nut is tightened pressure plate 9 is moved but not rotated. Of course the mating surfaces of locking nut and pressure plate must have a smooth finish.

In FIG. 2 reference numeral 12 indicates a metal connecting piece one end of which is provided with a stop in the form of a flange 13 which is perpendicular to the axis of the connecting piece. The other end of the connecting piece 12 comprises a first screw thread portion 14 which is suitable for connection to a metal pipe end, 34. A cylindrical coupling member, which is made of polyethylene is slidingly fitted around connecting piece 12 and extends from the stop 13 to a second screw thread portion 16 which is applied to the outer surface of connecting piece 12 and which is located between the first screw thread portion 41 and the stop 13. The end of coupling member 15 which engages the stop 13 is provided with an internal circular recess 17 into which flange 13 of connecting piece 12 fits. The other end of coupling member 15 is provided with a sealing chamber 18 which is formed in the inner surface, and accommodates a rubber sealing ring 19. A force is exercised on rubber ring 19 by means of hold-down element 20 which causes rubber ring 19 to be pressed against the walls of sealing chamber 18 and against the outer wall of connecting piece 12 in which way it effects a gastight seal between coupling member 15 and connecting piece 12. The hold-down element 20 includes a loose pressure ring 21, which is, for example, made of metal or hard plastic material and which is seated in sealing chamber 18, one end of which engages sealing ring 19 and the other end of which projects over a small distance above the open end of chamber 18. The hold-down element 20 further comprises a locking nut 22 which is provided with an internal screw thread which can be moved over the screw thread portion 16 of connecting piece 12. A flat pressure plate 23 is integrally connected to locking nut 22 and provided with an outer cylindrical collar 24, the inner surface of which contacts the outer surface of coupling member 15. When locking nut 22 is tightened, pressure plate 23 exercise a force on sealing ring 21 which, in its turn, exercises a force on sealing ring 19 and which effects the above-mentioned gas-tight seal. At the same time the coupling member 15 is pressed against stop 13. The force exercised by the compressed sealing ring onto wall portion 25 of the sealing chamber 18 does not result in a deformation because said wall portion is enclosed by collar 24 of pressure plate 23. By providing the mating surfaces of pressure plate 23 and pressure ring 21 with a smooth finish the rotation of pressure plate 23 which is caused when locking nut 22 is tightened is not transferred to pressure ring 21. In FIG. 2 reference numeral 26 indicates a plastic pipe end which is welded onto the outer surface of coupling member 15.

What is claimed is:

1. A high strength coupling device for coupling an end of a plastic pipe to an end of a metal pipe, comprising a tubular metal connecting piece having an external screw thread along at least part of the length of the piece, the connecting piece having an end having means for coupling to a metal pipe end, and an other end having a stop; a cylindrical plastic coupling member surrounding the portion of the length of the connecting piece, retained by abutment against said stop, and having an annular recess adjoining the connecting piece and adapted for welding to plastic pipe; a sealing ring disposed in said recess for sealing between said connecting piece and the coupling member; and a hold-down element having an internal screw thread engaging said external screw thread such that rotation of the hold-down element moves it axially along said member, and an end facing the member;

wherein the coupling member has an end facing the hold-down element, said annular recess being open at said coupling member end so that axial movement of the hold-down member toward the coupling member applies force directly on the sealing ring.

2. A device as claimed in claim 1 wherein the hold-down element includes a pressure ring disposed at least partly in the annular recess between the sealing ring and the hold-down element.

3. A device as claimed in claim 1, wherein the hold-down element has an outer cylindrical collar extending toward the stop end of the connecting piece and having an inner surface engaging an outer surface of the coupling member.

4. A method of gas-tight coupling an end of a plastic pipe to an end of a metal pipe, comprising:

the sequential steps of placing a cylindrical plastic coupling member about a metal connecting piece which has a stop at one end, with the member abutting the stop; then fusing the coupling member to a wall of the plastic pipe; then installing a sealing ring between the coupling member and the connecting piece in an annular groove in the coupling member having an end opening axially away from the stop; then clamping the sealing ring securely in the sealing chamber by screwing a hold-down element toward the stop, along an external thread on the connecting piece; and connecting an end of the connecting piece, opposite the stop, to a metal pipe end.

5. A method as claimed in claim 4 wherein said connecting step is performed before said installing step.

* * * * *